United States Patent [19]

Possati, deceased et al.

[11] Patent Number: 5,259,121
[45] Date of Patent: Nov. 9, 1993

[54] APPARATUS FOR A MULTIPLE CHECKING OF INTERNAL DIMENSIONS

[75] Inventors: Mario Possati, deceased, late of Bologna, Italy, by Gabriella Manfredi, Alberto Possati, Stefano Possati, heirs; Edoardo Possati, heir, Geneva, Switzerland; Marco Possati, heir, New York, N.Y.; Carlo Dall'Aglio, Volta Reno di Argelato; Luciano Ventura, Zola Predosa, both of Italy

[73] Assignee: Marposs Societa' per Azioni, S. Marino di Bentivoglio, Italy

[21] Appl. No.: 768,747

[22] PCT Filed: Feb. 22, 1991

[86] PCT No.: PCT/EP91/00335
§ 371 Date: Oct. 18, 1991
§ 102(e) Date: Oct. 18, 1991

[87] PCT Pub. No.: WO91/14152
PCT Pub. Date: Sep. 19, 1991

[30] Foreign Application Priority Data

Mar. 8, 1990 [IT] Italy .................. 3380 A/90

[51] Int. Cl.$^5$ ............... G01B 7/12; G01B 5/12
[52] U.S. Cl. ..................... 33/542; 33/543; 33/544.5
[58] Field of Search ........... 33/542, 543, 544, 544.1, 33/544.2, 544.3, 544.5, 549, 550, 552, 600, 603

[56] References Cited

U.S. PATENT DOCUMENTS

| | | | |
|---|---|---|---|
| 2,659,157 | 11/1953 | Aller | 33/542 |
| 4,338,726 | 7/1982 | Swailes | 33/542 |
| 4,393,698 | 7/1983 | Pietzsch et al. | 73/118 |
| 4,412,385 | 11/1983 | Selleri | 33/542 |
| 4,872,269 | 10/1989 | Sattmann | 33/542 |
| 4,986,004 | 1/1991 | Hartmann et al. | 33/544.2 |

FOREIGN PATENT DOCUMENTS

| | | |
|---|---|---|
| 3024334 | 1/1982 | Fed. Rep. of Germany . |
| 3533239 | 3/1987 | Fed. Rep. of Germany . |
| 8602996 | 5/1986 | PCT Int'l Appl. . |
| 639753 | 11/1983 | Switzerland . |
| 2167862 | 6/1986 | United Kingdom . |

Primary Examiner—William A. Cuchlinski, Jr.
Assistant Examiner—C. W. Fulton
Attorney, Agent, or Firm—Stevens, Davis, Miller & Mosher

[57] ABSTRACT

An apparatus for the automatic and simultaneous checking of holes comprises plug gauge devices (11-16) with gauging heads (70, 71) and elements for coupling to a support. The coupling elements are substantially constituted by parallel shafts (29-32) displacing the gauging heads (70, 71) from a rest position to a measurement position, and vice versa, through rotational displacements automatically controlled by relevant actuation devices (60-65). The angular position of the shafts is detected by transducers (52-55), which are connected to a processing unit (58) also receiving the signals of the gauging heads (70, 71). The plug gauge devices comprise further heads (86-89) coupled to rotatable rods (82, 83) for simultaneously gauging diametral dimensions of a hole (10) communicating with the other holes (4-9) and transversal to them. The apparatus is particularly adapted for checking the holes of a cylinder block of an internal combustion engine.

16 Claims, 3 Drawing Sheets

APPARATUS FOR A MULTIPLE CHECKING OF INTERNAL DIMENSIONS

DESCRIPTION

1. Technical Field

The invention relates to a checking apparatus for multiple checkings of internal dimensions, with support means for supporting a part having at least a hole of which it is desired to check a plurality of radial dimensions in a wide measurement range; a support body mutually movable with respect to the support means along a longitudinal axis; measurement devices carried by the support body, the measurement devices including checking heads for cooperating with the surface of the hole in corresponding zones and having transducer devices providing electrical signals; coupling means between the checking heads and the support body, the coupling means permitting displacements of the checking heads to perform checkings in said wide measurement range; transducer means for detecting the position of the checking heads with respect to the support body; and actuating means including first actuating means for performing mutual displacements between the support body and the support means and second actuating means for controlling said displacements of the checking heads.

2. Background Art

A checking apparatus having the above-mentioned features is disclosed in International Patent Application WO-A-8602996, that refers in particular to an apparatus for carrying out measurements of a plurality of internal and/or external linear dimensions, comprising a support body carried by a horizontal slide, on its turn carried by a vertical slide. The support body carries a plurality of measuring heads, each of which is provided with a movable arm carrying a feeler and with a transducer for detecting the position of the movable arm with respect to the body of the head. Each measuring head can be adjusted, independently of the others, both in horizontal (radial) and vertical direction and the radial positions of the heads with respect to the support body are detected by further corresponding transducers.

The part to be checked is arranged on a rotatable support, which is rotated for performing dynamical checkings of dimensions and/or shape of a plurality of cylindrical surfaces.

In particular, a specific embodiment relates to an apparatus with four measuring heads which can be simultaneously adjusted, along radial directions at 90° from one another, by means of a device having two superimposed disks, of which the upper disk has guide grooves and the lower disk through openings for vertical pins coupled to the measuring heads for adjustment control. The adjustment is carried out by causing a mutual rotation of the two disks and detecting the radial position of the heads by four position tranducers.

The apparatuses described in international patent application WO-A-8602996 although flexible or, more exactly, retoolable for checking parts of different types, do not appear adapted for automatic checkings in wide measurement ranges.

Moreover, since each measuring head is provided with its own adjustment device and corresponding transducer, radially arranged, for detecting the head position, these known apparatuses are structurally very complex, bulky, expensive and difficult to use.

Patent application GB-A-2167862 discloses an apparatus for dimensional checkings, for example of parts like turbine blades, comprising a plurality of slides equipped with transducers detecting the position of each slide with respect to corresponding supports.

In particular, a vertical slide carries two groups of measuring heads for subsequently checking two opposite sides of a blade. In fact, for carrying out a measurement cycle, the slides are automatically displaced, in sequence, to a plurality of predetermined positions, depending on the signals of the transducers associated with the slides. In each of the predetermined positions, the signals of the heads indicate deviations of the corresponding dimensions from those of a master part by means of which the apparatus is initially zero-set.

This known apparatus is dedicated to the checking of a rather complex part and is, on its turn, complex both mechanically and electronically. The apparatus operates substantially as a multicomparator gauge featuring, at least partially, automatic and electronically programmable retooling. In fact, although capable of measuring parts having different nominal dimensions, the apparatus must be programmed for the specific type of part and the type of part which is loaded on the apparatus for being measured must be identified in order to start the corresponding measurement cycle.

DISCLOSURE OF INVENTION

Object of the invention is to provide an apparatus for checking internal dimensions which permits to check, in an automatic and simultaneous way, a plurality of dimensions in a wide measuring range and has a structure particularly compact and inexpensive, but at the same time such as to guarantee good accuracies and repeatabilities.

This object is reached by an apparatus in which said coupling means comprise at least one coupling element, movable with respect to the support body and supporting a plurality of said checking heads, the transducer means including transducers adapted to detect the position of said at least one coupling element with respect to the support body, and the second actuating means including an actuating device for controlling displacements of said at least one coupling element with respect to the support body.

This apparatus is of special purpose type, or dedicated, because is adapted to particular measuring problems, but in connection with these problems offers considerable flexibility and measurement cycles of short duration. The apparatus according to the invention can be made with small overall dimensions and this leads to advantages such as the possibility to check, with wide measurement ranges, a plurality of internal dimensions having small nominal value, as well as a plurality of internal dimensions in cross-sections arranged next to one another and/or at considerable depths, i.e. at considerable axial distance from the end of the relevant hole.

A further object of the invention is to provide an apparatus for automatically checking, in the same measuring phase, dimensional features relating to different holes of a part, one of said holes communicating with the others and having its axis arranged transversely to those of the other holes.

This further object is reached by an apparatus in which said coupling means comprise at least one coupling element, movable with respect to the support body and supporting a plurality of said checking heads, the transducer means including transducers adapted to detect the position of said at least one coupling element with respect to the support body, the second actuating means including an actuating device for controlling displacements of said at least one coupling element with respect to the support body, and in which the measurement devices include further checking heads adapted to cooperate with the surface of the second hole and further coupling means for coupling the further checking heads to the support body. The same further object is reached also by a checking apparatus with multiple plug gauges for checking first holes of a part and a second hole of the same part, the first holes defining parallel geometric axes and the second hole communicating with the first holes and defining an axis transversal to the axes of the first holes, comprising: support means for supporting the part, a support body mutually movable with respect to the support means, along a longitudinal axis parallel to the axes of the first holes, first actuating means for controlling mutual displacements of the support body and support means, plug gauge measuring devices carried by the support body and including: checking head adapted to cooperate with the surfaces of the first holes, coupling means for movably coupling the checking heads to the support body, further checking heads adapted to cooperate with the surface of the second hole, and further coupling means for movably coupling the further checking heads to the support body, second actuating means for controlling displacements of the coupling means with respect to the support body, further actuating means for controlling displacements of the further coupling means with respect to the support body, and a control unit for automatically controlling the second and the further actuating means. Each of such apparatuses permits, with a compact structure, single and combined checkings relating to features of parts having holes not easily accessible. Each apparatus permits also quick, accurate and reliable checkings and provides a considerable flexibility of use for checking parts with nominal dimensions falling within a wide measurement range.

BRIEF DESCRIPTION OF DRAWINGS

An apparatus according to the preferred embodiment of the invention is now described with reference to the annexed sheets of drawings, given by way of non-limiting example, wherein.

BEST MODE FOR CARRYING OUT THE INVENTION

Figure 1:
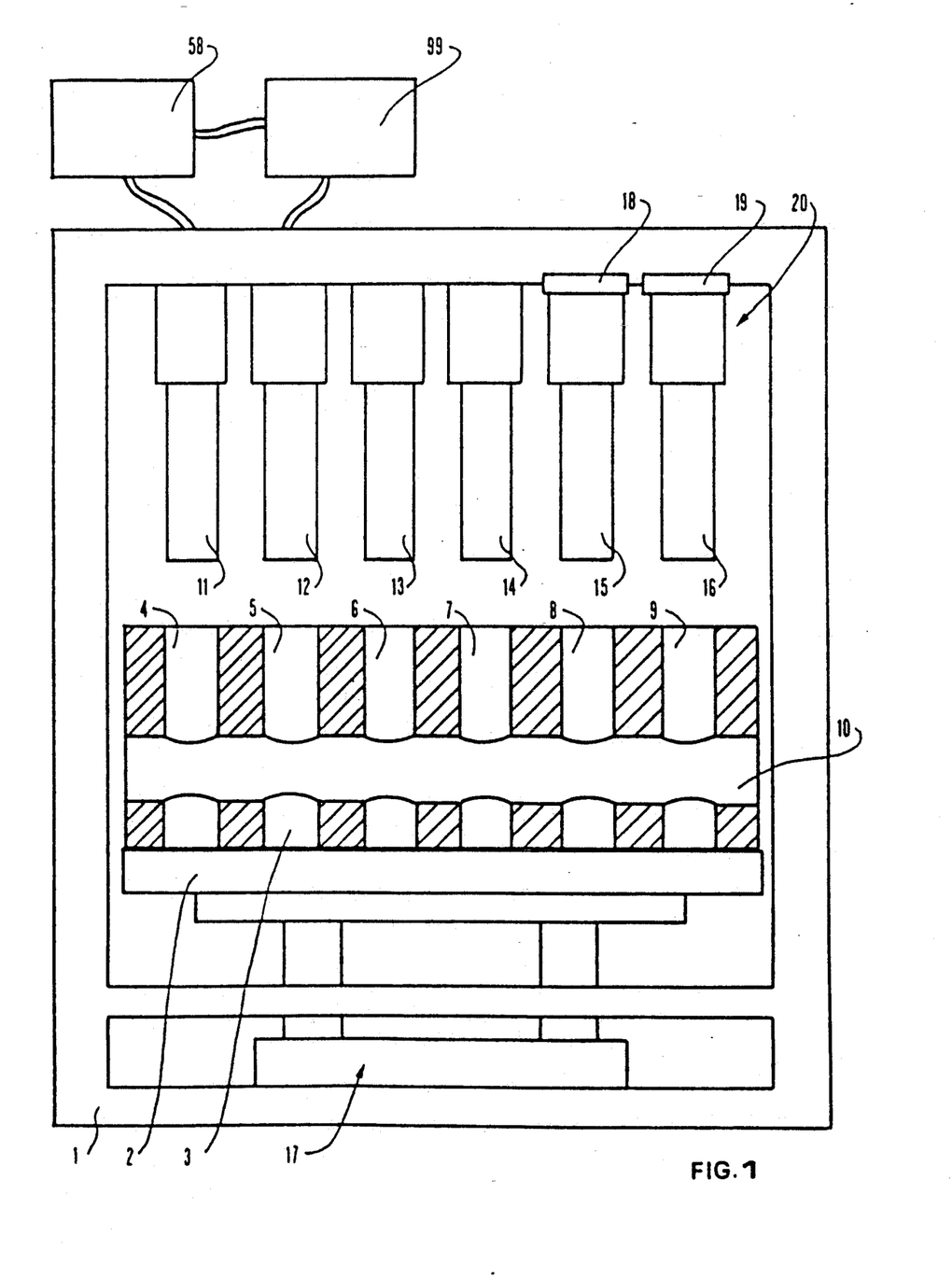
FIG. 1 is a general schematic view of an apparatus according to the the invention.

FIG. 1 schematically shows the structure of an apparatus according to the invention, with a support body 1 and support means comprising a support and reference platform 2 for supporting and positioning a part 3 to be checked. Part 3, for example the motor block of a six-cylinder engine, also schematically shown in the figure, comprises six cylindrical seats with cylinder liners 4,5, 6,7,8 and 9, and a seat 10 for the driving shaft.

Measuring devices or plug gauges 11,12,13,14,15 and 16 are secured to support body 1, in positions such that the plug gauges are arranged along parallel longitudinal axes, substantially coinciding with the longitudinal axes defined by the corresponding liners 4–9 of motor block 3. Support body 1 and support means 2 can perform mutual longitudinal translations for displacing each plug gauge 11–16 into cooperation with the corresponding liner 4–9. In particular, support means 2 can, for example, translate upwards and thus displace part 3 towards plug gauges 11–16, by first actuating means of known type, schematized in FIG. 1 and denoted by reference numeral 17.

Positioning and locking devices 18 and 19 are secured to support body 1 and permit the locking and unlocking of two of said plug gauges, 15 and 16. In this way, the measuring apparatus can easily and quickly be adapted for checking a four-cylinder or five-cylinder motor block, while, vice versa, the addition of one or both the plug gauges 15 and 16 can be made in accurate and equally simple and quick way, for checking again a motor block 3 like that illustrated. The devices 18 and 19 include known positioning and locking elements and are not shown in detail in the figures.

The structure of the six plug gauges 11–16 is substantially the same and consequently the following description is referred, as an example, to only one of them, plug gauge 11, shown in FIGS. 2 to 7.

Figure 2:
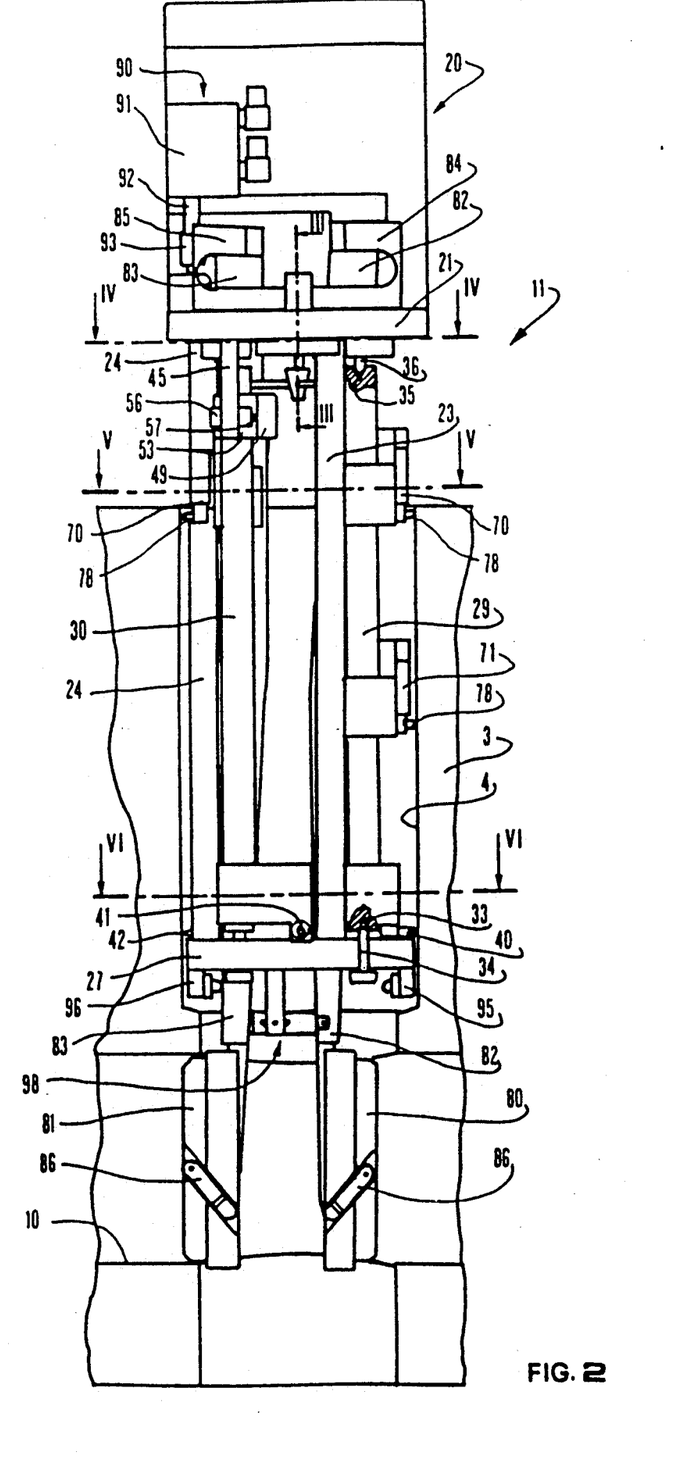
FIG. 2 is a front view, with some details cross-sectioned and other details omitted for the sake of clarity, of a plug gauge device of the apparatus of FIG. 1.
Figure 3:
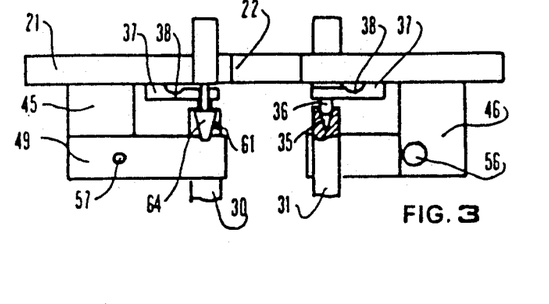
FIG. 3 is a cross-section of a detail of the device of FIG. 2, along line III—III of FIG. 2, with the omission of some elements.
Figure 4:
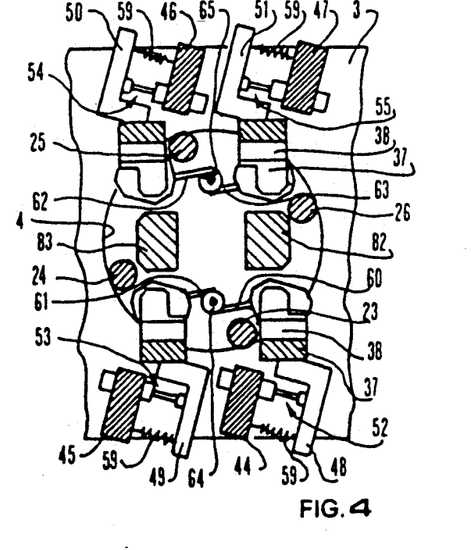
FIGS. 4, 5 and 6 are cross-sections of the device of FIG. 2 along lines IV—IV, V—V and VI—VI of FIG. 2, in which some details are omitted for the sake of clarity.

As a matter of fact, FIG. 2 shows plug gauge 11 housed within the corresponding liner 4 of motor block 3, as a consequence of the approach, along the longitudinal direction, between support means 2 and body 1.

A frame 20 is directly coupled to support body 1 and includes a support plate 21 having a central opening 22. As shown, in connection with plug gauges 15 and 16, the relevant frames 20 are fixed to the above mentioned devices 18 and 19.

Four uprights 23,24,25 and 26 are secured to plate 21 in correspondence with first relevant upper ends arranged—mutually parallel along longitudinal directions—about opening 22. A circular plate 27 having an opening 28 is secured to the lower, free ends of uprights 23–26. Coupling means comprise four elongate elements or shafts 29,30,31 and 32, having at their ends conical seats or "centres", and arranged—between corresponding pairs of centre points coupled to plates 21 and 27 and cooperating with the conical seats—parallel to one another in positions substantially coinciding with four generating lines, at 90° from one another, of a geometric cylindrical surface defining a longitudinal central axis.

In particular, each shaft, for example shaft 29, comprises a conical seat or centre 33, which is engaged by a centre point 34 coupled to circular plate 27 by a threaded coupling, and a conical seat 35 that cooperates with a second centre point 36. The second centre point 36 is coupled to plate 21 through a coupling element 37 including an integral fulcrum 38 (FIG. 3), so as to apply an axial resilient thrust to shaft 29 towards first point 34, and define the longitudinal position of the same shaft 29, by eliminating any clearance, also in view of possible wear. The particular coupling of shafts 29–32 to plates 21 and 27 permits the same shafts to perform rotations about their longitudinal geometric axes.

Four fixed contact elements or datums 40,41,42 and 43 are adjustably coupled to shafts 29-32, next to plate 27, by locking elements of "tie" type permitting angular and longitudinal adjustments and include portions adapted to contact the surface of liner 4, substantially in four points located at 90° from one another on the same cross-section. Datums 40-43 are made and arranged so that rotations of each shaft (for example of shaft 29 about the axis defined by the relevant centre points) cause rotations of the relevant datum (40) about the same axis, that cause the contacting portion to move away from, or approach the surface of liner 4 along a transversal arc, and to contact said surface along a direction substantially perpendicular to the same surface.

Transducer means 52,53,54 and 55, coupled to frame 20, are arranged to cooperate with shafts 29-32 and to provide electric signals indicative of the angular positions of these shafts 29-32. A processing and display unit, schematically shown in FIG. 1 and denoted by reference numeral 58, is connected to transducer means 52-55 and processes said electric signals for obtaining diametral measurements of liner 4. The transducer means can comprise, for example,—as shown in the figures—four differential transducers 52-55 connected as follows.

Four stationary supports 44,45,46 and 47 are secured to plate 21 and four rotatable supports 48,49,50 and 51 are coupled to shafts 29,30,31 and 32 next to said plate 21, each of the rotatable supports 48 (and 49-51) being opposed to a corresponding stationary support 44 (and 45-47) and rotatable with respect to it, together with the corresponding shaft 29 (and 30-32). Each of transducers 52-55 comprises two mutually movable parts, in particular windings 56 fixed to one of the stationary supports 44-47 and a core 57 coupled to the corresponding rotatable support 48-51.

Second actuating means comprise actuating devices of passive type, i.e. not motorized. In particular, to each pair of stationary and rotatable supports 44-47 and 48-51, are coupled the two ends of a return spring 59, which pulls towards each other said stationary and rotatable supports, by applying to the corresponding shaft 29-32 a rotation moment.

The second actuating means also comprise retraction means with four datum bars 60,61,62 and 63, each of which is secured transversely, to one of shafts 29-32. Two reference elements or cones 64 and 65 are fixed to plate 21 and arranged with the axes parallel to shafts 29-32. Cones 64,65 can be displaced along their axes so as to take two positions. The general arrangement of the retraction means —which include bars 60-62 and cones 64,65—is such that the surface of each cone 64 (65) is into contact with a pair of bars 60,61 (62,63) and in this way limits the angular displacements of the corresponding pair of shafts 29,30 (31,32) caused by springs 59. Therefore, by axially displacing reference cones 64 and 65 it is possible to change the angular position of shafts 29-32 and of the elements coupled thereto, in particular of fixed datums 40-43 and of rotatable supports 48-51 carrying cores 57 of transducers 52-55. It is pointed out that the retraction means can be made in different way, for example to include a single reference cone centrally arranged, that cooperates with all of the four bars 60-63 to control by a single motion the rotation of the four shafts 29-32.

Figure 5:
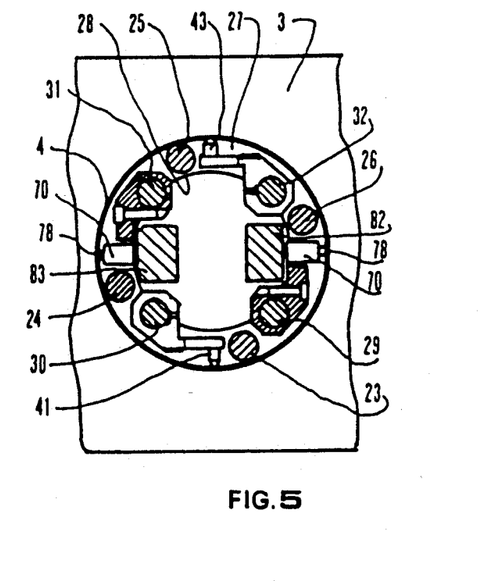
Figure 6:
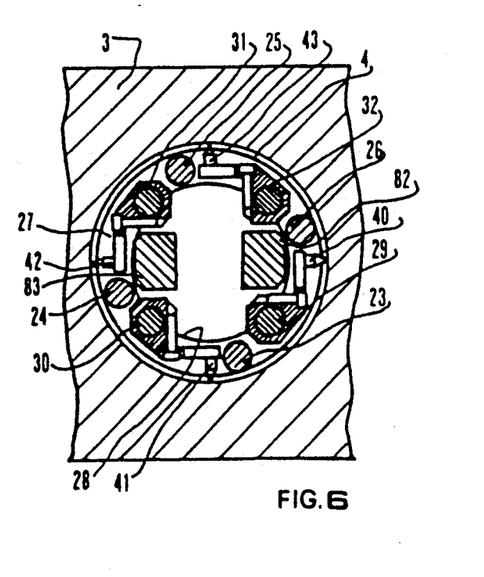

Eight checking heads, in particular comparative gauging heads, are coupled by pairs 70,71 to each shaft 29-32 by locking elements of "tie" type. For simplicity's sake, only some of these heads are schematically shown in FIGS. 2 and 5, in particular the two heads 70 and 71 coupled to shaft 29 and only one (70) of the two heads coupled to shaft 31. Each of heads 70,71 comprises a stationary part, a movable part carrying a feeler element 78 adapted to contact the surface of liner 4, fulcrum means for permitting mutual displacements between the movable and the stationary part, and a transducer device electrically connected to unit 58 for providing an electric signal depending on the position taken by the movable part as a consequence of the contact between feeler 78 and the surface to be checked. In the particular embodiment shown in the figures, heads 70,71 comprise means with deformable fulcrums and transducer devices providing electrical signals responsive to said deformations, for example as described in international application published with No. WO-A-8903507.

The longitudinal position of heads 70,71 on shafts 29-32 permits the relevant feelers 78—in correspondence with suitable angular positions of shafts 29-32 defined, substantially, by the contact between relevant datums 40-43 and the surface of liner 4—to touch the surface of liner 4 on two cross-sections, substantially in four points, arranged at 90° from one another, of each cross-section.

Two cylindrical nosepieces 80,81 are fixed to lower first ends of corresponding longitudinal bars 82,83, belonging to further coupling means. Bars 82,83 are partially housed within plug gauge 11, i.e. in substance between uprights 23-26 and shafts 29-32, pass through opening 28 of plate 27 next to said first ends, and pass through opening 22 of plate 21 next to the upper opposed ends, which are secured to the same plate 21 by elements 84,85 with integral fulcrums. Elements 84 and 85 with integral fulcrums define mutually parallel transversal axes for the rotation of bars 82 and 83 and, consequently, of nosepieces 80 and 81.

Figure 7:
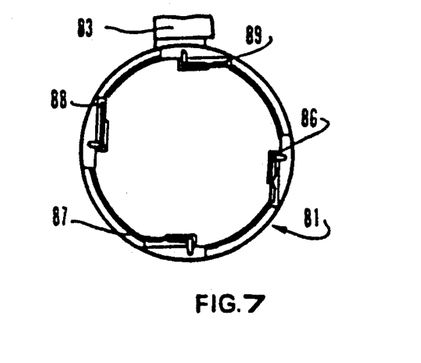
FIG. 7 is a side view of a detail of the device of FIG. 2.

Each of nosepieces 80 and 81 comprises, on the cylindrical side surface, four elongate seats for housing measuring means, in particular further checking heads or, more exactly, comparative gauging heads 86,87,88 and 89, shown in FIG. 7 and including relevant stationary parts, movable parts carrying feelers, fulcrum means and transducer devices electrically connected to unit 58. Similarly to heads 70,71, the further heads 86-89 are made, for example, as described in international application published under No. WO-A-8903507.

The further heads 86-89 of each of the two nosepieces 80 and 81 are arranged so that, after said nosepieces are inserted, through liner 4, into the seat 10 for the motor shaft, the relevant feelers enter into contact with the surface of said seat 10, on two cross-sections perpendicular to the axis of seat 10, oppositely arranged with respect to the geometric axis of liner 4, substantially in four points of this cross-section arranged at 90° from one another.

Nosepieces 80 and 81 are sealingly closed and are connected to a pneumatic circuit (not shown in the figures), controlling, by intake of air from the nosepiece and consequent depression within the same nosepiece, movements of withdrawal or retraction of the movable parts of heads 86-89, for moving the relevant feelers away from a checking position and permitting entering of the nosepieces into seat 10 of the motor shaft.

The rotation of longitudinal bars 82 and 83 about the transversal axes defined by fulcrum elements 84,85 is controlled by further actuating means, schematized in FIG. 2 and denoted by reference numeral 90, which include pneumatic jacks with a cylinder 91 rigidly coupled to a bar 82 and a piston 92 having at the free end a datum 93 contacting a portion secured to plate 21.

The proper checking position of nosepieces 80, 81 within seat 10 is defined by stop elements 95,96, rigidly fixed to circular plate 27, which limit the angular elongation of bars 82,83 by directly cooperating with portions of these bars in proximity of plate 27. For the sake of clarity, FIG. 2 shows only one of the further actuating means 90, while only one (83) of the two bars and the relevant nosepiece (81) are in the position for checking the hole 10, and bar 82 and nosepiece 80 are retracted to a rest position.

Between plate 27 and longitudinal bars 82,83 there are arranged guide devices—one of which, 98, schematized in FIG. 2—including, basically, mutually rotatable levers, adapted to prevent, substantially, displacements of the same bars 82,83 different from those of rotation about the transversal axes defined by elements 84,85.

A control unit, denoted in FIG. 1 by reference numeral 99, is connected to processing unit 58 and to the first, second and further actuating means for automatically controlling the displacements of the various elements of the apparatus.

The operation of the apparatus is now described.

At first, zero-setting operations on a standard part or "master" are carried out by the following manual or semi-automatic cycle.

By acting, through control unit 99, on the retraction means of each plug gauge 11-16, i.e. by causing upward axial displacements of cones 64,65, shafts 29-32 are caused to rotate, due to the action of springs 59, in such a way that datums 40-43 and feeler elements 78 of checking heads 70,71 remain within the plug gauge, namely within a transversal space defined in substance by the dimensions of plate 27.

Actuating means 90, through a pneumatic circuit connected to control unit 99 and not shown in the figure, control the rotation of bars 82 and 83 in such a way that also nosepieces 80 and 81 remain within said space, while the pneumatic circuit also controls the retraction of the further heads 86-89 of each nosepiece 80,81.

The master is loaded, for example by a roller conveyor, onto platform 2, where it takes a datum position; then it is lifted—by control unit 99 and actuating means 17—towards a checking position, in which plug gauges 11-16 are inserted into the corresponding cylinder liners 4-9.

A new actuation of the retraction means causes axial displacements of cones 64 and 65 in the direction opposite to the preceding one, so that, due to the action of springs 59, shafts 29-32 rotate until datums 40-43 contact corresponding points of liner 4. The zero-setting or calibration of the apparatus as to the checkings relating to the liner 4 is carried out in this condition. For this purpose, one acts on transducers 52-55, checking heads 70,71 and the relevant tie locking elements, and processing and display unit 58 in such a way that, for example, the electric signals of these transducers 52-55 and heads 70,71 (or combined values of these signals) reach the zero value. The position of checking heads 70,71 on shafts 29-32 is—during this phase—adjusted and locked by the tie elements so that the corresponding feelers 78 surely enter, before datums 40-43, into contact with the surface of liner 4.

Thereafter, by acting on actuating means 90, bars 82,83 are caused to rotate until abutting against the corresponding stop elements 95,96. In these conditions, the contact of the feelers of the further heads 86-89 with the surface of seat 10 of the master defines the corresponding condition of mechanical calibration. Then, by acting on unit 58, the signals of heads 86-89 are adjusted to the zero value.

Once the mechanical and electrical zero-setting operations on the master are terminated, it is possible to perform the checking of part 3, that can be carried out in fully automatic manner, under the control of control unit 99.

The procedure for arranging part 3 in the checking position is quite similar to that described in connection with the master.

The actuation of the retraction means causes the displacement of cones 64 and 65 in axial direction, towards plate 21, and consequently shafts 29-32, due to the action of springs 59, rotate until datums 40-43 contact corresponding points of liner 4.

Transversal dimensions of liner 4, for example the diameter of the cross-section, are checked depending on the signals provided by transducers 52-55 in the condition when the four datums 40-43 contact liner 4. In particular, the signals provided by transducers 52-55 to processing unit 58, are indicative of the deviations of the transversal dimensions of the part from those of the master.

The signals provided by checking heads 70,71, in correspondence with the angular position of shafts 29-32 defined by said contact between datums 40-43 and the surface of liner 4, are processed in unit 58 for obtaining derived measurements relating to concentricity and/or straightness errors of the cylindrical surface of liner 4. In particular, from the signals of four heads 70 measuring in the same cross-section it is possible to obtain, for example, the transversal deviation of the centre of said cross-section from the centre of the corresponding cross-section of the master and/or from the centre of the cross-section defined by datums 40-43, in order to obtain information as to the so-called concentricity of the cylindrical surface. Or, by processing the signals of one or more pairs of heads 70 and 71 secured to the same shaft 29 (and therefore cooperating, substantially, with two points of the same generating line of the cylindrical surface of liner 4,) it is possible, for example, to obtain information about the so-called straightness of the cylindrical surface.

The use, for each plug gauge 11-16, of four transducers 52-55 connected to unit 58 and, above all, the rotation movements of heads 70,71—together with shafts 29,32—from and towards the surfaces to be checked, permit the use of a compact apparatus having small overall dimensions for checking parts in a wide measuring range; moreover, the angularly adjustable coupling of datums 40-43 70,71 to shafts 29-32 permit a sufficiently quick retooling for checking parts having dimensions considerably different. Moreover, the possibility of using six plug gauges 11-16 or—by a simple and quick modification—only four or five 11-14 of them, as already explained, contributes to the considerable flexibility of use of the apparatus.

It is pointed out that the number of checking heads 70,71 coupled to shafts 29-32 can be increased or decreased with respect to what has been illustrated, depending on the type of checking to be performed and/or the major or minor precision required for a determined checking. Heads 70,71, for example, can be fixed to only two opposed shafts 29 and 31, according to the simplified showing of FIG. 5. Moreover, the above described heads 70,71 can be replaced by a different type of heads adapted to carry out similar measurements, for example pneumatic heads, also coupled to shafts 29-32 in an axially and angularly adjustable way and rotatable with said shafts 29-32. Also the transducer means 52-55, that according to the example of the figures are constituted by transducers of differential type, can generally be made in different way, for example as angular transducers of optical type.

For checking seat 10, actuating means 90 control the rotation of bars 82,83 and the consequent insertion of nosepieces 80,81 into the seat 10 for the motor shaft, in a checking position defined by stop elements 95,96. The feelers of heads 86-89, after the releasing of the pneumatic retraction preventing mechanical interferences in the phase of insertion, contact the surface of seat 10 in correspondence with determined cross-sections; the transducer devices of the same heads 86-89 provide electrical signals that, by processing in unit 58, permit the measurement of diameters of seat 10.

The constructional features of the nosepieces 80,81 supporting heads 86-89, the arrangement of bars 82,83 within the casing of plug gauge 11 and the relevant actuating means 90 permit the obtainment of a plug gauge with a considerably compact structure and provide the possibility of carrying out, in a quick, simple and precise way, single or combined measurements of the internal dimensions of motor block 3.

We claim:

1. A checking apparatus for multiple checkings of internal dimensions, with support means (2) for supporting a part (3) having at least a hole (4) of which it is desired to check a plurality of radial dimensions in a wide measurement range; a support body (1) mutually movable with respect to the support means (2) along a longitudinal axis; measurement devices (11-16) carried by the support body (1), the measurement devices including checking heads (70,71) for cooperating with the surface of the hole (4) in corresponding zones and having transducer devices providing electric signals; coupling means (29-32) between the checking heads (70,71) and the support body (1), the coupling means (29-32) permitting displacements of the checking heads (70,71) to perform checkings in said wide measurement range; transducer means (52-55) for detecting the positions of the checking heads (70,71) with respect to the support body (1;20,21); and actuating means (17;59-65) including first actuating means (17) for performing mutual displacements between the support body (1) and the support means (2) and second actuating means (59-65) for controlling said displacements of the checking heads (70,71), characterized in that said coupling means comprise at least one coupling element (29-32), movable with respect to the support body (1) and supporting a plurality of said checking heads (70,71), the transducer means (52-55) including transducers adapted to detect the position of said at least one coupling element (29-32) with respect to the support body (1), and the second actuating means including an actuating device (59-65) for controlling displacements of said at least one coupling element (29-32) with respect to the support body (1).

2. The apparatus according to claim 1, characterized in that the coupling element (29-32) can perform rotation movements about an axis parallel to said longitudinal axis.

3. The apparatus according to claim 2, characterized in that the coupling element (29-32) carries a contact element (40-43) adapted to contact the part (3) for limiting the rotation movements of the coupling element (29-32) and defining a checking position for said plurality of checking heads (70,71).

4. The apparatus according to claim 3, for checking internal dimensions, characterized in that said coupling means comprise at least two elongate coupling elements (29-32) adapted to carry out movements of rotation about relevant axes parallel to said longitudinal axis, and arranged opposite to and equidistant from the longitudinal axis, the checking heads (70,71) being coupled to the elongate coupling elements (29-32) in a way angularly and longitudinally adjustable, each of said at least two elongate coupling elements (29-32) carrying a corresponding contact element (40-43) through an angularly and longitudinally adjustable coupling.

5. An apparatus according to claim 4, characterized in that said coupling means comprise four elongate coupling elements (29-32) adapted to carry out rotation movements about corresponding axes parallel to said longitudinal axis and arranged at the same distance about it.

6. The apparatus according to claim 5, characterized in that the transducers (52-55) are coupled to the support body (1) and to the elongate coupling elements (29-32) and are adapted to detect the angular position of the elongate coupling elements (29-32), the second actuating means (59-65) including a retraction device (60-65) and resilient means (59) adapted to cooperate with the elongate coupling elements (29-32) and with the support body (1) for controlling the rotation movements of the elongate coupling elements (29-32).

7. The apparatus according to claim 6, characterized in that the actuating device (59-65) comprises reference elements (64,65) for defining an angular rest position of the elongate coupling elements (29-32), the overall transversal dimensions of the checking heads (70,71) and of the contact elements (40-43) about said longitudinal axis being, in said rest position, lower than the diametral dimensions of the hole (4).

8. The apparatus according to claim 1, characterized in that the checking heads (70,71) comprise movable parts carrying feelers (78) adapted to contact corresponding zones of the surface of the hole (4), the electric signals provided by the relevant transducer devices being responsive to the positions of the movable parts.

9. The apparatus according to claim 1 for checking the dimensions of a first (4) and a second (10) hole of the part (3), the holes being in communication with each other and having geometric axes intersecting each other, characterized in that the measurement devices (11-16) include further checking heads (86-89) adapted to cooperate with the surface of the second hole (10) and further coupling means (82,83) for coupling the further checking heads (86-89) to the support body (1).

10. The apparatus according to claim 9, characterized in that said further coupling means (82,83) are adapted to movably couple the further checking heads (86-89) to the support body (1), for permitting the displacement from a rest position to a checking position, in which the further checking heads (86-89) can cooperate with the surface of the second hole (10), the transversal overall dimensions of the further checking heads (86-89) and of the further coupling means (82-83) about the geometrical axis of the first hole (4) being, in said rest position, lower than the transversal dimensions of the first hole (4).

11. The apparatus according to claim 10, characterized in that it comprises at least a nosepiece (80,81) and at least a pair of said further checking heads (86-89) coupled to the nosepiece (80,81), the further coupling means including at least a substantially longitudinal bar (82,83) supporting the nosepiece (80,81) and coupled to the support body (1) to be rotatable about a transversal axis for displacing the further checking heads (86-89) from the rest position to the checking position and vice versa, the apparatus further comprising stop means (95,96) adapted to cooperate with the bar (82,83) for defining the checking position.

12. The apparatus according to claim 11, wherein the first hole (4) and the second hole (10) are perpendicular to each other, the second hole (10) having two sections opposite with respect to the geometrical axis of the first hole (4), characterized in that it comprises two nosepieces (80,81), each supporting at least one of said further checking heads (86-89), for checking, respectively, two opposite cross-sections of the second hole, the further coupling means including two bars (82,83) supporting said nosepieces (80,81) and rotatable about two substantially parallel axes.

13. The apparatus according to claim 12, characterized in that the actuating means comprise further actuating means (90-93) coupled to the support body (1) and the bars (82,83) for controlling rotation of the bars about said parallel axes and displacing the further checking heads (86-89) from the rest position to the checking position and vice versa.

14. A checking apparatus with multiple plug gauges for checking first holes (4-9) of a part (3) and a second hole of the same part (3), the first holes (4-9) defining parallel geometric axes and the second hole (10) communicating with the first holes (4-9) and defining an axis transversal to the axes of the first holes, comprising:

support means (2) for supporting the part (3), a support body (1) mutually movable with respect to the support means (2), along a longitudinal axis parallel to the axes of the first holes (4-9), first actuating means (17) for controlling mutual displacements of the support body (1) and support means (2), plug gauge measuring devices (11-16) carried by the support body (1) and including:
checking heads (70,71) adapted to cooperate with the surfaces of the first holes (4-9),
coupling means (29-32) for movably coupling the checking heads (70,71) to the support body (1),
further checking heads (86-89) adapted to cooperate with the surface of the second hole (10), and
further coupling means (82,83) for movably coupling the further checking heads (86-89) to the support body (1), second actuating means (59-65) for controlling displacements of the coupling means (29-32) with respect to the support body (1), further actuating means (90-93) for controlling displacements of the further coupling means (82,83) with respect to the support body (1), and a control unit (99) for automatically controlling the second (59-65) and further (90-93) actuating means.

15. The apparatus according to claim 14, wherein the axis of the second hole (10) is substantially perpendicular to the axes of the first holes, characterized in that the coupling means (29-32) are adapted to carry out movements of rotation about geometric axes parallel to the axes of the first holes (4-9) for displacing the checking heads (70,71) from a rest position to a checking position, and the further coupling means (82,83) are adapted to carry out movements of rotation about axes perpendicular to both the axes of the first holes (4-9) and the axis of the second hole (10) for displacing the further checking heads (86-89) from a rest position to a checking position.

16. The apparatus according to claim 15, characterized in that the plug gauge measuring devices comprise at least four plug gauge devices (11-14).

* * * * *

UNITED STATES PATENT AND TRADEMARK OFFICE
CERTIFICATE OF CORRECTION

PATENT NO. : 5,259,121

DATED : November 9, 1993

INVENTOR(S) : Mario POSSATI, (deceased), et al

It is certified that error appears in the above-identified patent and that said Letters Patent is hereby corrected as shown below:

Column 8, line 55, after "40-43" insert -- and that angularly and axially adjustable of checking heads --.

Signed and Sealed this

Tenth Day of May, 1994

Attest:

BRUCE LEHMAN

Attesting Officer

Commissioner of Patents and Trademarks